(12) United States Patent
Cheng et al.

(10) Patent No.: US 9,743,009 B2
(45) Date of Patent: Aug. 22, 2017

(54) IMAGE PROCESSING METHOD AND IMAGE PROCESSING DEVICE

(71) Applicant: ASUSTeK COMPUTER INC., Taipei (TW)

(72) Inventors: Yi-Chi Cheng, Taipei (TW); Hsiu-Jui Kuo, Taipei (TW); Hendrik Hendrik, Taipei (TW); Guan-De Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 14/623,995

(22) Filed: Feb. 17, 2015

(65) Prior Publication Data

US 2015/0237248 A1 Aug. 20, 2015

(30) Foreign Application Priority Data

Feb. 20, 2014 (TW) .............................. 103105670 A

(51) Int. Cl.
*H04N 5/232* (2006.01)
*H04N 5/235* (2006.01)
(Continued)

(52) U.S. Cl.
CPC ....... *H04N 5/2351* (2013.01); *H04N 5/23219* (2013.01); *H04N 5/243* (2013.01)

(58) Field of Classification Search
CPC ............. H04N 5/2353; H04N 5/23229; H04N 5/2351; H04N 5/23219; H04N 5/243; G06K 9/00221
(Continued)

(56) References Cited

U.S. PATENT DOCUMENTS 7,864,228 B2 * 1/2011 Mori .................. H04N 5/23293
348/240.99
8,121,404 B2 2/2012 Xiao et al.
(Continued)

FOREIGN PATENT DOCUMENTS

CN 101013250 A 8/2007
CN 101202841 B 6/2008
(Continued)

*Primary Examiner* — Lin Ye
*Assistant Examiner* — Marly Camargo
(74) *Attorney, Agent, or Firm* — Muncy, Geissler, Olds & Lowe, P.C.

(57) ABSTRACT

An image processing method applied in an image processing device, which includes an image capturing unit, an image processing unit, an image recognition unit and an exposure adjusting unit, is provided. The image processing method includes the following steps: obtaining a first image by the image capturing unit, generating an average brightness of a dark part of the first image by the image processing unit; recognizing the first image by the image recognition unit; generating a first average brightness of a human face by the image processing unit and generating a first exposure value according to the average brightness of the dark part of the first image, the first average brightness of the human face and a weight array, when the human face is recognized from the first image; and adjusting an exposure of the first image according to the first exposure value by the exposure adjusting unit.

6 Claims, 2 Drawing Sheets

(51) Int. Cl.
*G06K 9/00* (2006.01)
*H04N 5/243* (2006.01)

(58) Field of Classification Search
USPC ......... 348/222.1, 220.1, 362, 364, 366, 370;
382/115, 118, 190, 254, 274; 396/155,
396/161, 166, 234
See application file for complete search history.

(56) References Cited

U.S. PATENT DOCUMENTS

| | | | |
|---|---|---|---|
| 8,237,853 B2 | 8/2012 | Takahashi | |
| 8,698,948 B2 * | 4/2014 | Ikeda | H04N 5/238 348/364 |
| 9,402,033 B2 | 7/2016 | Takahashi | |
| 2003/0071908 A1 | 4/2003 | Sannoh et al. | |
| 2005/0265626 A1 * | 12/2005 | Endo | G06K 9/00228 382/274 |
| 2007/0177050 A1 | 8/2007 | Xiao et al. | |
| 2007/0216777 A1 * | 9/2007 | Quan | G06K 9/34 348/222.1 |
| 2008/0024616 A1 | 1/2008 | Takahashi | |
| 2009/0060328 A1 * | 3/2009 | Manabe | H04N 5/23212 382/168 |
| 2009/0175511 A1 | 7/2009 | Lee et al. | |
| 2010/0209015 A1 * | 8/2010 | Yu et al. | G06K 9/38 382/270 |
| 2010/0328498 A1 * | 12/2010 | Yang et al. | H04N 5/238 348/364 |
| 2011/0052175 A1 | 3/2011 | Shih et al. | |
| 2011/0169980 A1 * | 7/2011 | Cho | H04N 5/235 348/223.1 |
| 2012/0206642 A1 | 8/2012 | Takahashi | |
| 2012/0262600 A1 * | 10/2012 | Velarde et al. | H04N 9/73 348/223.1 |
| 2012/0281111 A1 * | 11/2012 | Jo | H04N 5/217 348/229.1 |
| 2012/0307107 A1 | 12/2012 | Brunner | |
| 2012/0312960 A1 * | 12/2012 | Mine | H04N 5/23219 250/206 |
| 2014/0348399 A1 * | 11/2014 | Kuo | G06K 9/00228 382/118 |
| 2015/0244916 A1 * | 8/2015 | Kang et al. | H04N 5/2353 |
| 2015/0244923 A1 * | 8/2015 | Lee | H04N 5/2353 348/234 |

FOREIGN PATENT DOCUMENTS

| | | |
|---|---|---|
| CN | 101118366 B | 1/2013 |
| EP | 1814081 A2 | 8/2007 |
| TW | 201101815 A | 1/2011 |
| TW | 201110684 A1 | 3/2011 |

* cited by examiner

IMAGE PROCESSING METHOD AND IMAGE PROCESSING DEVICE

CROSS-REFERENCE TO RELATED APPLICATION

This application claims the priority benefit of Taiwan application serial No. 103105670, filed on Feb. 20, 2014. The entirety of the above-mentioned patent application is hereby incorporated by reference herein and made a part of specification.

BACKGROUND OF THE INVENTION

Field of the Invention

The invention relates to an image processing method and an image processing device and, more particularly, to an image processing method and an image processing device capable of adjusting automatic exposure value.

Description of the Related Art

In recent years, photographing, or recording video becomes popular in daily life. All of a notebook computer, a tablet computer and a mobile phone are equipped with a camera. Users are now desire to use high-end equipment on photographing and video communication anywhere and anytime. However, if the surrounding environment is bad for taking photograph, or recording video, such as insufficient light, backlight or a high contrast (both a very high brightness and a very low brightness exit in the environment at the same time), the quality of the shot image may be affected and cannot present its original appearance.

Conventionally, most automatic exposure process does not consider the content differences in the image. No matter the exposure value is calculated via the whole picture (that is evaluative metering) or the center weighted method, the particular area of the image, such as part of the human face, is still too dark or too bright, and the quality of the image is not good. For an instance, when the human face is not found (for example, the human face is in the environment with strong backlight) by the camera, the image cannot be obtained even if the area of the human face is calculated by the automatic exposure process.

BRIEF SUMMARY OF THE INVENTION

An image processing method applied in an image processing device is provided. The image processing device includes an image capturing unit, an image processing unit, an image recognition unit and an exposure adjusting unit. The image processing method includes following steps: obtaining a first image by the image capturing unit, and generating a first average brightness value of a dark part of the first image by the image processing unit; recognizing the first image by the image recognition unit; when a human face is recognized from the first image, generating a first average brightness value of the human face by the image processing unit, and generating a first exposure value by the image processing unit according to the first average brightness value of the dark part of the first image, the first average brightness value of the human face and a weight array; and adjusting the exposure of the first image by the exposure adjusting unit according to the first exposure value.

Moreover, an image processing device is further provided, it includes an image capturing unit, an image processing unit, an image recognition unit and an exposure adjusting unit. The image capturing unit obtains a first image. The image processing unit is coupled to the image capturing unit, and generates a first average brightness of the dark part of the first image. The image recognition unit is coupled to the image capturing unit and the image processing unit, and recognizes the first image. The exposure adjusting unit is coupled to the image processing unit, and adjusts the exposure of the first image according to a first exposure value. When the human face is recognized from the first image by the image recognition unit, the image processing unit generates a first average brightness value of the human face, and a first exposure value is generated according to the first average brightness value of the dark part of the first image, the first average brightness value of the human face and a weight array.

In the image processing method and the image processing device of the embodiments, the image capturing unit obtains an image, the image processing unit generates an average brightness value of a dark part of the image and the image recognition unit recognizes the images. When the human face is recognized from the first image, generating an average brightness value of the human face by the image processing unit, and an exposure value is generated according to the average brightness value of the dark part, the average brightness value of the human face and a weight array, and the exposure adjusting unit adjusts the exposure of the image by according to the exposure value. As a result, the human face and the dark part of the image presents details more clear and obtain better quality.

DETAILED DESCRIPTION OF THE EMBODIMENTS

Figure 1:
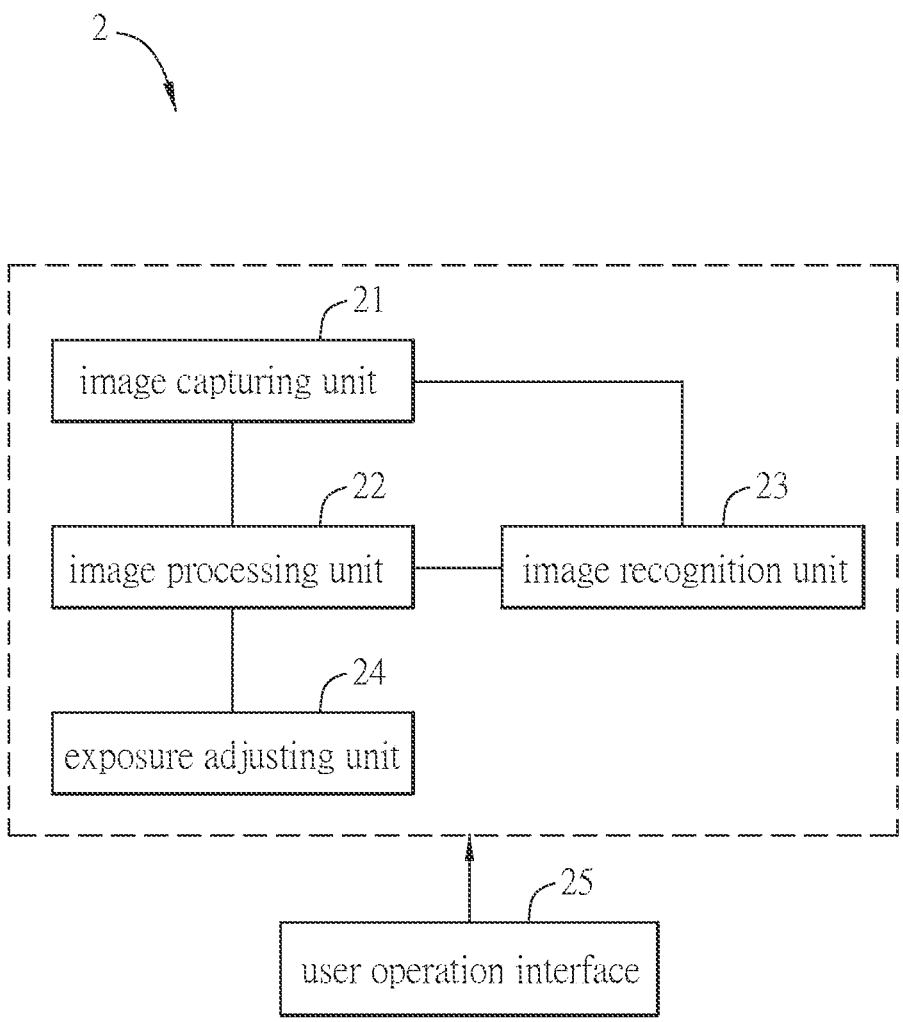
FIG. 1 is a block diagram showing an image processing device in an embodiment.

FIG. 1 is a block diagram showing an image processing device 2 in an embodiment. The image processing device 2 may be a portable electronic device with an image capturing unit (such as a camera), such as a tablet computer, a notebook computer, a smart phone, a multimedia audio device, a portable gaming device or a portable electronic device with a camera lens. Moreover, the image processing device 2 also may be a fixing-type electronic device or a monitoring system, such as a monitor device or a security monitoring system.

The image processing device 2 includes an image capturing unit 21, an image processing unit 22, an image recognition unit 23 and an exposure adjusting unit 24. In an embodiment, the image processing device 2 further includes a storage unit (not shown in FIG. 1).

The image capturing unit 21 captures an image (such as a first image), the image processing unit 22 is coupled to the image capturing unit 21 and generates an average brightness values of a dark part of the first image. The image recognition unit 23 is coupled to the image capturing unit 21 and the image processing unit 22, respectively. The image recognition unit 23 recognizes an image, when the image recognition unit 23 recognizes the human face from the image (it means that the area of the human face is not too dark or not too bright), the image processing unit 22 would generate an average brightness value of the human face. At the time, the image processing unit 22 further generates an exposure value according to the average brightness value of the dark part of the first image, the average brightness value of the human face and a weight array and generates a label value, and the label value is set as a first parameter value (for example, the label value is set to be 1). In an embodiment, the weight array is a default weight array, and the weighting of the average brightness value of the dark part of the first image is larger than the weighting of the average brightness value of the human face, consequently, the human face and the dark part in the image present more details and get better quality.

Moreover, since the label value generated by the image processing unit 22 is already set as a first parameter value, it means that the image recognition unit 23 already recognizes the human face from the captured first image; conversely, if the label value generated is not set as the first parameter value (for example, it is an initial value 0), it means that the image recognition unit 23 does not recognize the human face from the first image captured by the image capturing unit 21. The reason that the human face is not recognized form the image may be that the face is too dark to be recognized when in the backlight; the captured image is too dark to be recognized; or the foreground (face) is too bright and the background is too dark to be recognized (that is overexposure). If the label value is not equal to the first parameter value, it means that the image recognition unit 23 cannot recognize the human face from all of the first images captured by the image capturing unit 21.

In one embodiment, the exposure adjusting unit 24 is coupled to the image processing unit 22. When the image recognition unit 23 recognizes the human face from the image (it means that the label value is the first parameter value), the exposure adjusting unit 24 adjusts the exposure of the image according to the exposure value to get better display quality.

Moreover, if the image recognition unit 23 cannot recognize the human face from the first image, the label value is not the first parameter value, the exposure adjusting unit 24 adjusts the exposure of the image according to the average brightness value of the dark part of the first image. Therefore, the exposure of the image can be adjusted to be brighter (if the area of the human face is too dark) or darker (if the area of the human face is too bright), and then the human face and the dark in the image can present more details and get better quality.

Moreover, as shown in FIG. 1, the image recognition unit 23 and the image processing unit 22 are two independent components. However, in other embodiments, the image recognition unit 23 and the image processing unit 22 is integrated into a signal component (such as a control unit) according to the layout and the design of the circuit. Furthermore, the storage unit is coupled to the image capturing unit 21, the image processing unit 22, the image recognition unit 23 and the exposure adjusting unit 24, respectively. The storage unit can store a plurality of the first images captured by the image capturing unit 21, the average brightness value of the dark part of these first images, the average brightness value of the human face of these first images (if the human face in these first images is recognized), the weight array and the exposure value to allow the image processing unit 22, the image recognition unit 23 or the exposure adjusting unit 24 to access.

In addition, in the embodiment, the weight array is a group of numerical value stored in the storage unit, for example, the numerical value is (⅔, ⅓) or other combinations. The number of the weight array stored in the storage unit is determined according to the demands of the product and the images processing. When multiple groups of weight arrays are stored in the storage unit, the image processing unit 22 can choose a different weight array according to a different photo mode. For example, as shown in FIG. 1, the image processing device 2 further includes a user operation interface 25 which provides multiple photo modes for users, such as a night mode, a fireworks mode, an outdoor sunlight mode, or an outdoor artificial lighting mode, the storage unit has different weight arrays corresponding to different photo modes. When one of the photo modes is chosen, the image processing unit 22 chooses a corresponding weight array from the storage unit to calculate. Moreover, the image processing device 2 further includes a sensing unit (not shown in FIG. 1) sensing the conditions of the external environment, such as the brightness of the foreground and the background, and providing the sensing result to the image processing unit 22, and then the image processing unit 22 selects a group of weight array according to the sensing result. Moreover, in the other embodiment, the weight array is input from external, that is, the weight array is input via the user operation interface 25, and then the image is adjusted according to the demands and the preferences of users.

Moreover, if the image capturing unit 21 gets another image (such as a second image) according to the operation, the image processing unit 22 also can generate an average brightness value of the dark part of the second image. When the image recognition unit 23 cannot recognize the human face from the second image, and the label value is the first parameter value (it means that the human face is already recognized from the first image), the image processing unit 22 generates a second exposure value according to the average brightness of the dark part of the second image, the average brightness of the human face of the first image and a weight array, and the exposure adjusting unit 24 adjusts the exposure of the second image according to the second exposure value, and therefore the exposure of the second image is adjusted according to the average brightness of the human face of the first image of which the human face is recognized, so as to get better quality. Moreover, when the image recognition unit 23 cannot recognize the human face from the second image, and the label value is not the first parameter value (it means that the human face is not recognized from the image), and then the exposure adjusting unit 24 adjusts the exposure according to the average brightness of the dark part of the second image.

Figure 2:
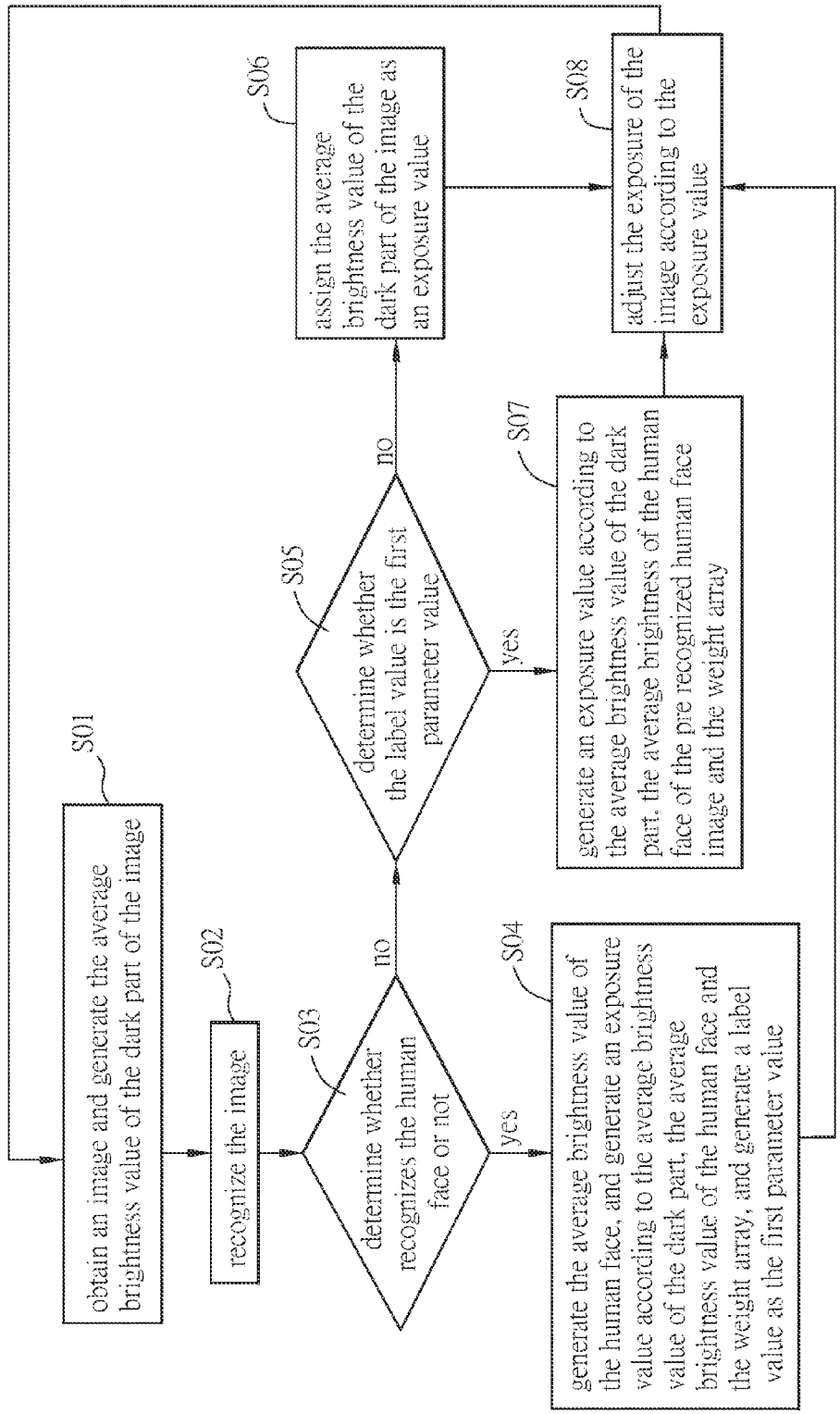
FIG. 2 is a flow chart showing an image processing method in an embodiment.

FIG. 2 is a flow chart showing an image processing method in an embodiment. The image processing method in the embodiment is illustrated with FIG. 2 and FIG. 1. The image processing method can be applied to the image processing device 2.

The image processing method includes the following steps. First, obtaining an image and generating the average brightness of the dark part of the image in step S01. In the step S01, the first image is obtained by the image capturing unit 21, and the average brightness value of the dark part of the first image is generated by the image processing unit 22. Then, recognizing the image in step S02. In the step S02, the first image is recognized by the image recognition unit 23. Then, determining whether recognizes the human face or not in step S03. In the step S03, if the human face is recognized, goes to step S04. In step S04, generating the average brightness value of the human face, and generating an exposure value according to the average brightness value of the dark part, the average brightness value of the human face and the weight array, and generating a label value as the first parameter value. In the step S04, the image processing unit 22 generates the average brightness value of human face of the first image, and a first exposure value is generated according to the average brightness of the dark part of the image, the average brightness of human face of the image and the weight array.

Moreover, since the image processing unit 22 already generates the volume value as the first parameter value, it means that human face is recognized from the image obtained by the image capturing unit 21. If the label value is not the first parameter value, it means that the human face is not recognized from the image (the image processing unit 22 can set the label value to 0, if the image processing method is used in the embodiment for the first time). Moreover, the weight array can be a group of numerical value stored in the storage unit, for example, the numerical value is (⅔, ⅓) or other combinations. The number of the weight array stored in the storage unit can be determined according to the demand of the product and the image processing, and the weight array may be one or more. When multiple groups of the weight array are stored in the storage unit, the image processing unit 22 can choose a different weight array according to different photo modes. In addition, in other embodiments, the weight array can be a weight array input from external. It means that, the user can input the weight array through the user operation interface 25 to adjust the effect of the image according to the demand and the preference of users.

After obtaining the exposure value of the image in the step S04, goes to step S08, adjusting the exposure of the image according to the exposure value. In the step S08, the exposure adjusting unit 24 adjusts the exposure of the image according to the exposure value. Consequently, the exposure of the image can be adjusted to be brighter (if the area of the human face is too dark) or darker (if the area of the human face is too brighter), and the human face and dark part in the image is shown more details and get better image quality. For example, when the weight array stored in the storage unit is (⅔, ⅓), and if the average brightness value of human face of the first image is 60, the average brightness value of the dark part of the first image is 36, after the calculation by the weight average mentioned above, the first exposure value of the first image is that 60×⅔+36×⅓=52, and then the exposure adjusting unit 24 adjusts the exposure of the first image according to the exposure value (that is 52). The first exposure value (52) is lower than the average brightness value 60 of the original human face of the first image, and thus it is to decrease the brightness. Then, back to the step S01 to get another image (such as a second image).

Moreover, in the step S03, if the human face is not recognized from the image, step S05 is executed. In the step S05, determining whether the label value is the first parameter value. If the label value is not the first parameter value (for example, it is the initial value 0), it means that the human face is not recognized from the image obtained by the image capturing unit 21, and then step S06 and step S08 are executed. In S06 and step S08, assigning the average brightness value of the dark part of the image as an exposure value, adjusting the exposure of the image according to the exposure value. In step S06 and step S08, the exposure adjusting unit 24 assigns the average brightness value of the dark part of the image as the exposure value, and it adjusts the exposure of the image according to the exposure value (the average brightness of the dark part). Therefore, the exposure of the image can be adjusted to be lighter (if the area of the human face is too dark) or darker (if the area of the human face is too bright), so that the human face and the dark part of the image can present more details and get better quality. Then, repeat the step S01.

Moreover, in the above step S05, if the label value is the first parameter value, it means that the human face is already recognized from the previous image obtained, so goes to step S07 and step S08. In step S07 and step S08: generating an exposure value according to the average brightness value of the dark part, the average brightness value of the human face of the pre recognized human face image and the weight array, and adjusting the exposure of the image according to the exposure value. Consequently, the current image can be adjusted its exposure according to the average brightness value of human face of the recognized previous human face image to get better image quality. Then, repeat the step S01. For example, if the human face can be recognized (the label value is the first parameter value) from the previous image (such as a first image), and the human face cannot recognized from the after image (such as a second image), then goes to step S07. In step S07, generating an exposure value according to the average brightness value of the dark part of the second image, the average brightness value of the human face of the first image and the weight array. If the images are ordered according to sequence (such as time), the second image can be a next image following the first image, that is, the order is a first image, a second image . . . ; or the second image can be an image not following the first image but after the first image, for example the sequence is that: a first image, a third image, . . . , a second image. Not matter how many images (may be one or more images) between the second image and the first image, human face cannot be recognized from those images.

In addition, other features of the image processing method can refer to the above illustration, which can be omitted herein.

In sum, In the image processing method and the image processing device of the embodiments, the image capturing unit captures images, and the image processing unit generates the average brightness value of the dark part of the image, and the image recognition unit recognizes the image, When the human face is recognized from the first image, the image processing unit generates the average brightness value of the human face, an exposure value is generated according to the average brightness value of the dark part, the average brightness value of the human face and the weight array, and the exposure adjusting unit adjusts the exposure of the image according to the exposure value. As a result, the human face and the dark part in the image can present more details and get better quality.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. An image processing method, executed by a portable electronic device having an image capturer and a control unit, the method comprising:
obtaining a first image by the image capturer;
generating a first average brightness value of a dark part of the first image by the control unit;
recognizing the first image by the control unit;
when a human face is recognized from the first image, generating a first average brightness value of the human face by the control unit, and generating a first exposure value by the control unit according to the first average brightness value of the dark part of the first image, the first average brightness value of the human face and a weight array;

adjusting the exposure of the first image by the control unit according to the first exposure value;

generating a label value and setting the label value as a first parameter value by the control unit when the human face is recognized from the first image;

obtaining a second image by the image capturer, and generating a second average brightness value of the dark part of the second image by the control unit;

recognizing the second image by the control unit;

generating a second exposure value by the control unit according to the second average brightness value of the dark part of the second image, the first average brightness value of the human face and the weight array when the human face is not recognized from the second image and the label value is the first parameter value; and adjusting the exposure of the second image by the control unit according to the second exposure value.

2. The image processing method according to claim 1, wherein when the human face is not recognized from the second image, and the label value is not the first parameter value, the control unit adjusts the exposure of the second image according to the second average brightness value of the dark part of the second image.

3. The image processing method according to claim 1, wherein the weight array is inputted via a user operation interface.

4. A portable electronic device, comprising:
an image capturer configured to obtain a first image; and
a controller coupled to the image capturer and configured to perform the steps of:
generating a first average brightness value of a dark part of the first image;
recognizing the first image;
when a human face is recognized from the first image, generating a first average brightness value of the human face, and generating a first exposure value according to the first average brightness value of the dark part of the first image, the first average brightness value of the human face and a weight array;
adjusting the exposure of the first image according to the first exposure value;
generating a label value and setting the label value as a first parameter value when the human face is recognized from the first image;
obtaining a second image by the image capturer, and generating a second average brightness value of the dark part of the second image;
recognizing the second image;
generating a second exposure value according to the second average brightness value of the dark part of the second image, the first average brightness value of the human face and the weight array when the human face is not recognized from the second image and the label value is the first parameter value; and
adjusting the exposure of the second image according to the second exposure value.

5. The portable electronic device according to claim 4, wherein when the human face is not recognized from the second image, and the label value is not the first parameter value, the controller is configured to perform the step of:
adjusting the exposure of the second image according to the second average brightness value of the dark part of the second image.

6. The portable electronic device according to claim 4, wherein the weight array is inputted via a user operation interface.

* * * * *